US009756974B2

(12) United States Patent
Rivera

(10) Patent No.: US 9,756,974 B2
(45) Date of Patent: Sep. 12, 2017

(54) BEVERAGE CARTRIDGE REPLACEMENT FOR SINGLE-SERVING BEVERAGE BREWERS

(71) Applicant: Adrian Rivera, Santa Fe Springs, CA (US)

(72) Inventor: Adrian Rivera, Santa Fe Springs, CA (US)

(*) Notice: Subject to any disclaimer, the term of this patent is extended or adjusted under 35 U.S.C. 154(b) by 210 days.

(21) Appl. No.: 14/276,919

(22) Filed: May 13, 2014

(65) Prior Publication Data

US 2015/0374165 A1 Dec. 31, 2015

Related U.S. Application Data

(63) Continuation-in-part of application No. 11/777,831, filed on Jul. 13, 2007, now Pat. No. 8,720,320, and a continuation-in-part of application No. 13/436,690, filed on Mar. 30, 2012, now Pat. No. 9,232,871, which is a continuation-in-part of application No. 11/777,831, and a continuation-in-part of application No. 12/610,181, filed on Oct. 30, 2009, now Pat. No. 8,621,981, and a continuation-in-part of application No. 12/620,584, filed on Nov. 17, 2009, now Pat. No. 8,291,812, application No. 14/276,919, which is a continuation-in-part of application No. 13/546,875, filed on Jul. 11, 2012, now Pat. No. 9,232,872, which is a continuation-in-part of application No. 11/777,831, and a continuation-in-part of application (Continued)

(51) Int. Cl.
*A47J 31/06* (2006.01)
*A47J 31/36* (2006.01)
*A47J 31/44* (2006.01)

(52) U.S. Cl.
CPC .......... *A47J 31/0668* (2013.01); *A47J 31/06* (2013.01); *A47J 31/0678* (2013.01); *A47J 31/0689* (2013.01); *A47J 31/3695* (2013.01); *A47J 31/4403* (2013.01)

(58) Field of Classification Search
CPC ............... A47J 31/0668; A47J 31/0689; A47J 31/3695; A47J 31/4403; A47J 31/06
USPC .................. 99/279, 295, 299, 302 R; 426/82
See application file for complete search history.

(56) References Cited

U.S. PATENT DOCUMENTS

D255,313 S * 6/1980 Elkerbout ...................... D7/400
5,325,765 A * 7/1994 Sylvan ................ A47J 31/0673
426/433
D407,602 S * 4/1999 Patel ............................. D7/400
(Continued)

*Primary Examiner* — Ghassem Alie
*Assistant Examiner* — Nhat Chieu Do
(74) *Attorney, Agent, or Firm* — IP Strategies

(57) ABSTRACT

A beverage brewing container is configured to be disposed within a brewing chamber of a beverage brewer and to hold brewing material while being brewed. The container includes a receptacle and a cover. The receptacle includes a base and a sidewall. The base has an interior surface and a passageway in an interior area of the base. The sidewall extends upward from the interior surface of the base. The cover is adapted to sealingly engage with a top edge of the sidewall and includes an opening. The container is configured to accept input fluid through the opening and to provide a corresponding outflow of fluid through the passageway. The passageway allows the outflow fluid to flow from the container without being substantially received by a needle of the beverage brewer.

12 Claims, 10 Drawing Sheets

Related U.S. Application Data

No. 12/610,181, and a continuation-in-part of application No. 12/620,584.

(56) References Cited

U.S. PATENT DOCUMENTS

| | | | | |
|---|---|---|---|---|
| 7,836,819 | B2 * | 11/2010 | Suggi Liverani ... | A47J 31/0668 426/82 |
| 7,946,217 | B2 * | 5/2011 | Favre ............... | A47J 31/0668 426/433 |
| D688,095 | S * | 8/2013 | DeMiglio ........... | D7/400 |
| 8,561,524 | B2 * | 10/2013 | DeMiglio ........... | A47J 31/0689 210/232 |
| D694,579 | S * | 12/2013 | Khubani ............ | D7/400 |
| 9,402,501 | B1 * | 8/2016 | Vu ................... | A47J 31/3623 |
| 2013/0017303 | A1 * | 1/2013 | Vu ................... | A47J 31/0689 426/433 |

* cited by examiner

BEVERAGE CARTRIDGE REPLACEMENT FOR SINGLE-SERVING BEVERAGE BREWERS

CROSS-REFERENCE TO RELATED APPLICATION

This is a continuation-in-part of U.S. patent application Ser. No. 11/777,831, which was filed on Jul. 13, 2007, now U.S. Pat. No. 8,720,320, which issued on May 13, 2014.

FIELD OF THE INVENTION

This invention generally relates to accessories for single-serve beverage brewers, and more particularly, relates to an adaptor assembly configured to provide operative compatibility between a single-serve beverage brewer and a beverage material.

BACKGROUND OF THE INVENTION

Various types of single-serve beverage brewers have been developed in recent years. These machines are generally designed with brewing chambers adapted to receive a small packet of ground coffee or other beverage material. Once the beverage packet is placed in the brewing chamber, the machine injects hot water into the packet to produce a single serving of freshly brewed beverage. Some machines have brewing chambers configured to receive pods that are small, flattened disk-shaped filter packages of beverage material, while other machines are configured to accommodate larger, cup-shaped beverage filter cartridges.

One particular type of single-serve beverage brewer designed to accommodate a cup-shaped beverage filter cartridge is manufactured and sold by Keurig Inc. of Wakefield, Mass. The machine has a brewing chamber dimensioned to receive cup-shaped cartridges such as those sold under the brand K-Cup. These cartridges are configured in the form of a container having a permeable filter packet containing a dry beverage medium such as ground coffee, which is disposed in the interior of the container. The machine also has upper and lower puncture needles. In operation, the upper needle punctures the top cover of the cartridge and injects pressurized water through the opening onto the beverage medium while the lower needle punctures the bottom of the cartridge to create an outlet for outflow of the brewed beverage. Additional detailed descriptions of this type of machine and cartridge are provided in U.S. Pat. Nos. 5,325,765, 5,840,189 and 6,606,938, which are incorporated herein by reference.

The configuration of the brewing chamber of the above-described single-serve beverage brewer inherently limits the use of the machine to disposable cup-shaped cartridges. Use of these machines results in waste in the form of a disposed cartridge for each brewed cup of coffee. The amount of trash generated by users of these cartridges multiplies quickly. Another consequence is that users of the Keurig machine or similar brewers designed for cup-shaped cartridges would have to purchase a different machine to brew beverage from pods, which are typically somewhat flattened disc-shaped filter paper packets containing coffee. The use of multiple machines can be costly, inconvenient and cause inefficient use of counter space. Thus, there is a need for an apparatus and method for modifying single-serve beverage brewers configured for cup-shaped cartridges so that they can also be used to brew beverages from pods.

Additionally, conventional automated pod brewers typically include a brewing chamber adapted to receive an individual pod. During the brewing process, hot water is injected into the brewing chamber across the surface of the pod while brewed beverage is directed to flow out of an outlet into a cup. Some coffee connoisseurs believe that coffee brewed using pod brewers do not have as good flavor extraction as coffee brewed by baristas who usually tamp or compact the coffee prior to brewing. Thus, there is a need for an improved pod brewing system.

Further, conventional automated pod brewers are not designed to brew coffee from loose grounds. A user of such a brewer is limited in selection to the coffee available for sale in pods, and beverage brewers configured for cup-shaped cartridges limit users to coffee available for purchase in cartridges. A coffee drinker who likes a coffee that is only available as loose grounds or as whole beans cannot brew this coffee in one of these types of brewers.

The present invention has been developed to ameliorate at least one of the above-mentioned shortcomings related to beverage brewing systems.

BRIEF SUMMARY OF THE INVENTION

As used herein, the term "pod" is a broad term to be interpreted according to its ordinary meaning, which includes a package formed of a water-permeable material and containing an amount of ground coffee or other beverage therein.

The present invention has several features, no single one of which is solely responsible for their desirable attributes. Without limiting the scope of this invention, its more prominent features will now be discussed briefly. However, not all of the following features are necessary to achieve the advantages of the device. Therefore, none of the following features should be viewed as limiting. After considering this discussion, and particularly after reading the section entitled "Detailed Description of the Invention," one will understand how the features of the invention provide advantages over conventional devices and in any case are novel.

According to an aspect of the invention, a beverage brewing container is configured to be disposed within a brewing chamber of a beverage brewer and to hold brewing material while brewed by the beverage brewer. The container includes a receptacle configured to receive the brewing material, and a cover. The receptacle includes a base and at least one sidewall. The base has an interior surface and a passageway in an interior area of the base. The passageway provides fluid communication from an interior of the receptacle to an exterior of the receptacle. The at least one sidewall extends upward from the interior surface of the base. The cover is adapted to sealingly engage with a top edge of the at least one sidewall and includes an opening. The container is configured to accept input fluid through the opening and to provide a corresponding outflow of fluid through the passageway. The passageway allows the outflow fluid to flow from the container without being substantially received by a needle of the beverage brewer.

According to another aspect of the invention, a beverage brewing container is configured to replace a brewing cartridge in a brewing chamber of a beverage brewer. The container is positionable within the brewing chamber and is configured to hold brewing material while brewed by the beverage brewer. The container includes a receptacle configured to receive and support the brewing material, and a cover. The receptacle includes a passageway, a base, and at least one sidewall. The passageway provides fluid communication between an interior of the receptacle and the brewing chamber. The base has an interior surface and an exterior surface and is configured to avoid contact with a needle of the beverage brewer. The at least one sidewall extends upward from the interior surface of the base and is configured to avoid contact with the needle. The cover is adapted to sealingly engage with a top edge of the at least one sidewall and includes an opening. The container is configured to accept input fluid through the opening and to provide a corresponding outflow of fluid through the passageway such that the outflow substantially avoids the needle.

According to either aspect of the invention, the receptacle can also include at least one extension extending from an exterior surface of the base such that at least a portion of the base is raised a predetermined distance above a support surface when a distal end of the at least one extension is in contact with the support surface. For example, the at least one extension can extend from a periphery of the base. Alternatively, the at least one extension can extend from an interior portion of the base. In the latter case, the at least one extension can include an aperture at least partially covered by a screen material.

Preferably, the container is reusable.

The passageway can have an unobstructed configuration.

The passageway can include a screen.

At least one portion of the at least one sidewall can include an aperture at least partially covered by a screen material.

The cover can include a perforated bay extending from the opening.

According to another aspect of the invention, a beverage brewer includes the container described above, a brewing chamber configured to receive the container, an inlet port configured to provide the input fluid to the container, and a needle that is adapted to receive outflow fluid from the container through the base passageway. The needle can be fixed in a bottom of the brewing chamber, adapted to puncture a shell of the brewing cartridge to carry an outflow of brewed beverage from the brewing cartridge, and arranged to avoid puncturing filtering material containing brewing material disposed inside the receptacle.

DETAILED DESCRIPTION OF THE INVENTION

A pod adaptor assembly according to the present invention is designed to be used in combination with a single-serving beverage brewer having a brewing chamber configured to receive a cup-shaped filter cartridge such as those sold under the brand K-Cup. Additional descriptions of certain embodiments of the brewer are disclosed in U.S. Pat. Nos. 6,708,600 and 7,165,488, which are incorporated herein in their entireties.

A conventional brewing cartridge is placed in a brewing chamber of a cartridge-style single-serving coffee maker, such as those disclosed in U.S. Pat. Nos. 5,325,765 and 5,840,189, which are incorporated by reference above. The conventional brewing cartridge includes a piercable shell and contains brewing material held in the cartridge by filter material. An upper needle, or liquid injector probe, of the coffee maker penetrates the top of the shell, and a bottom needle element, typically offset from the center, penetrates the shell from below when the brewing chamber is closed on the cartridge. The upper needle enters the brewing cartridge and contacts the brewing material, whereas the lower needle pierces the shell but typically avoids contact with the brewing material. A cartridge-style, single-serving coffee maker sold under the brand Keurig is configured to use a brewing cartridge sold under the brand K-Cup. The K-Cup brewing cartridges have a frusto-conical shape, a height of about 1¾ inches, a top rim having a diameter of about 2 inches, a diameter just below the top rim of about 1.8 inches, and a base having a diameter of about 1.43 inches.

Figure 1A:
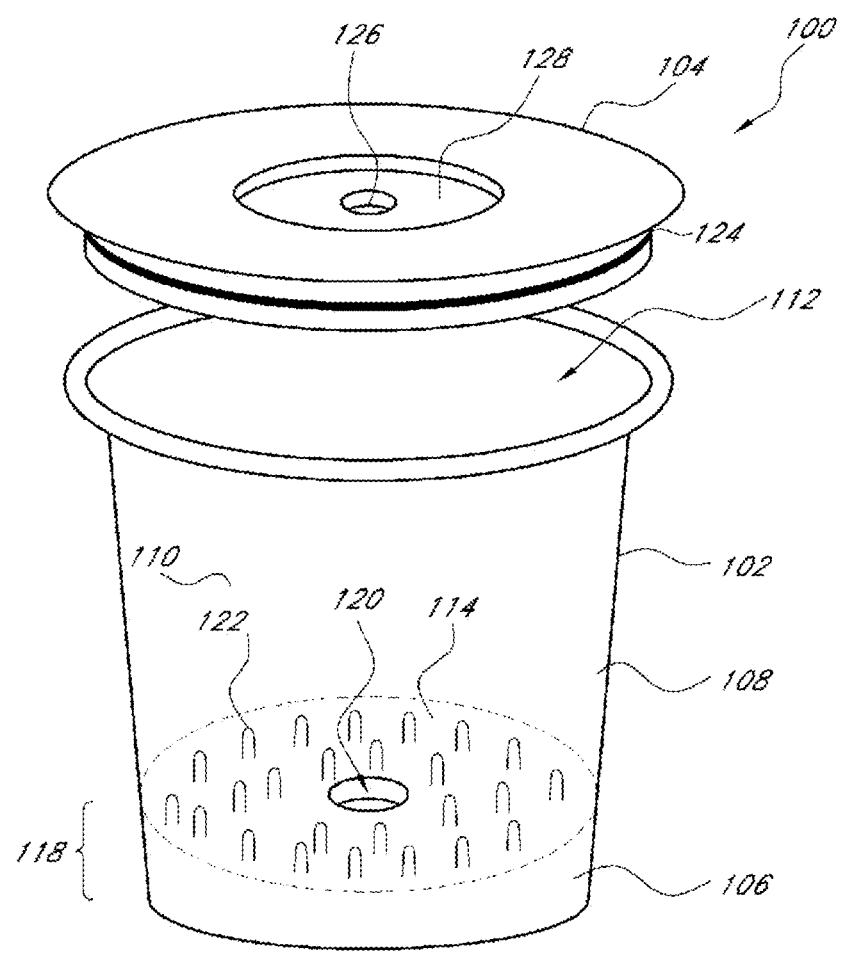
FIG. 1A is a schematic illustration of an exemplary embodiment of a pod adaptor assembly according to the invention.

FIG. 1A illustrates a pod adaptor assembly 100 of an embodiment of the present invention. As shown in FIG. 1A, the pod adaptor assembly 100 generally includes a cup-shaped, that is, truncated cone-shaped, receptacle 102, and a cover 104 adapted to sealingly engage with the receptacle 102. The receptacle 102 has a substantially circular base 106 and sidewalls 108 extending upward from the base 106 to define a housing 110 having an upper opening 112. The base 106 has an interior surface 114 and an exterior surface 116, which are separated by a distance 118 so that the interior surface 114 is elevated above the exterior surface by the distance. Preferably, the distance 118 is between about 1 and 20 mm. For example, in a particular embodiment the distance is about 10 mm. While some embodiments of the pod assembly utilize a cup-shaped receptacle, the receptacle can assume other shapes and configurations such as square or cylindrical without departing from the spirit and scope of the present invention.

As also shown in FIG. 1A, a passageway 120 is formed in the base 106 of the receptacle 102, extending between the interior and exterior surfaces 114, 116 of the base 106. The passageway 120 is configured to receive a needle that is typically mounted in the single-serving beverage brewer to puncture the bottom of a disposable cup-shaped filter. The location of the passageway 120 relative to the base 106 is preferably selected to match the relative location of the needle in the brewer. In a particular embodiment, the passageway 120 is slightly off-center from the base to correspond to the location of the needle. In operation, the needle is designed to move upward toward the bottom of the base 104 of the receptacle a first distance so as to puncture the bottom of the cup-shaped filter. To prevent the needle from hitting against the base of the receptacle or piercing the beverage pod inside the receptacle, the passageway 120 allows the needle to move freely without jamming against the receptacle or the pod. The passageway 120 also serves the purpose of providing an outlet for brewed beverage to flow out of the receptacle into a drinking vessel. In one embodiment, the passageway 120 is substantially circular and has a diameter of about 5 mm and a length of about 10 mm.

Figure 1B:
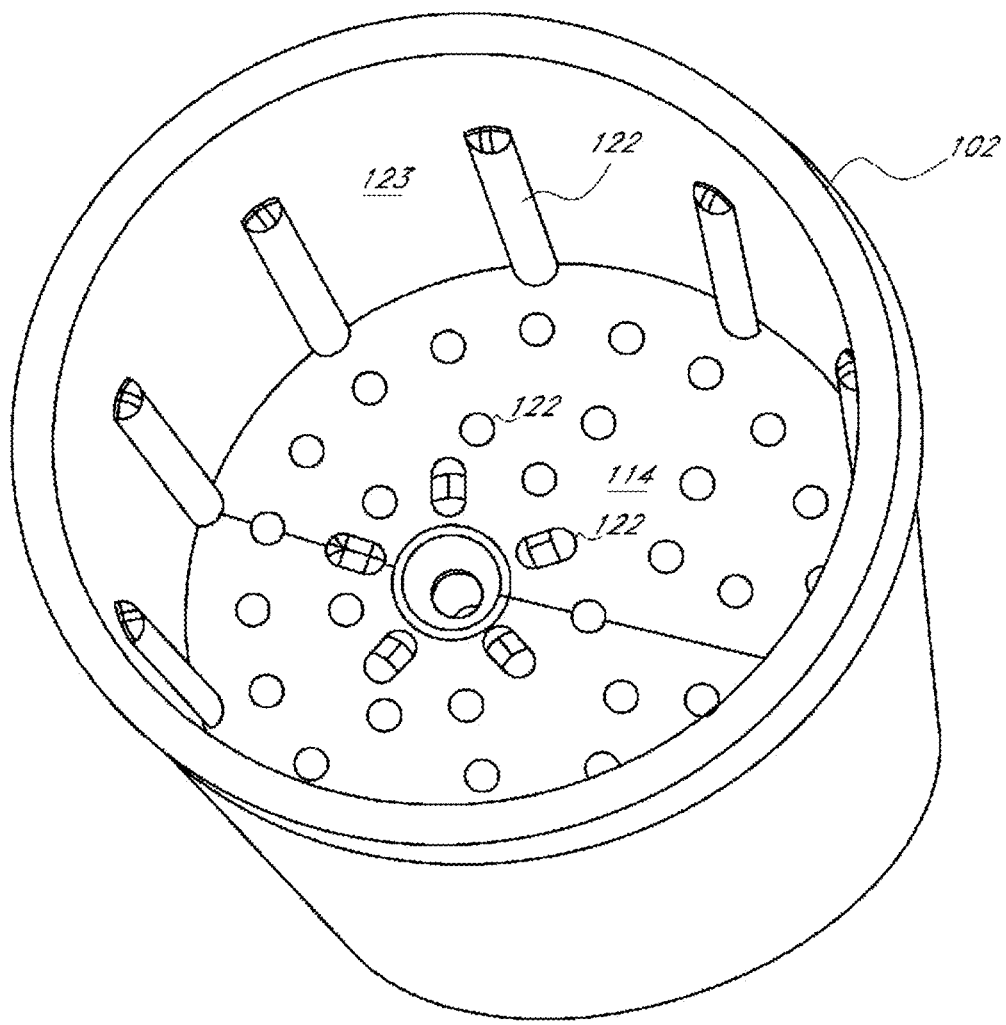
FIG. 1B is a schematic illustration of an exemplary embodiment of a receptacle of the pod adaptor assembly of FIG. 1A.

As FIG. 1A further shows, a plurality of spaced-apart protrusions 122 are formed across the interior surface 114 of the base. The protrusions 122 collectively provide a plurality of spaced-apart raised surfaces for the pod to rest against. When the pod is placed inside the receptacle and is resting against the protrusions, the gaps between the pod and the interior surface 114 of the base allow brewed beverage to flow unobstructed from the pod down through the passageway 120. In one implementation, the protrusions can be configured in the manner shown in FIG. 1B. As shown in FIG. 1B, the protrusions 122 comprise a plurality of circular and oval-shaped protrusions extending upward from the lower surface 114 of the receptacle 102. In some implementations, a plurality of ribs 122 are also arranged to extend outwardly from an interior side surface 123 of the receptacle 102.

As also shown in FIG. 1A, the cover 104 of the assembly 100 has a circular configuration and a seal 124 sized to sealingly engage the cover 104 to the receptacle opening 112 in a manner known in the art. The cover 104 has an opening 126 configured to accommodate a liquid inlet probe or other inlet port from the brewer. The liquid inlet probe is typically used to pierce the cup-shaped filter cartridge and introduce pressurized hot water into the cartridge. In certain embodiments, the cover 104 also has a circular recessed section 128 disposed concentrically around the opening 126. The circular recessed section 128 is adapted to mate with a correspondingly shaped circular protrusion formed on the single-serving brewer. The cover 104 includes a rim resting on a top edge of the receptacle 102 at the top of the sidewall 108. In some embodiments, the rim extends radially beyond the top edge.

Figure 1C:
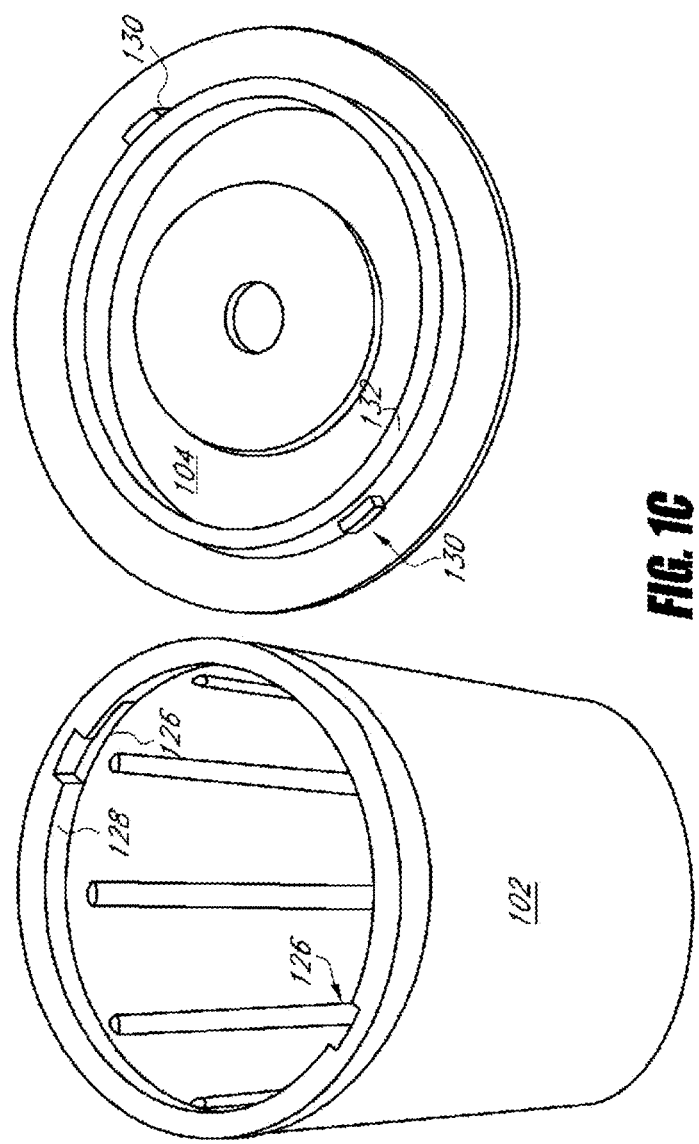
FIG. 1C is a schematic illustration of an exemplary embodiment of a receptacle of the pod adaptor assembly of FIG. 1A, illustrating a locking mechanism for securing the cover over the receptacle.

In certain embodiments, the assembly 100 further includes a locking mechanism adapted to lock the cover in place relative to the receptacle. FIG. 1C illustrates one example of such locking mechanism. As shown in FIG. 1C, a plurality of notches 126 are formed in the interior rim of the receptacle. The notches 126 are configured to engage with mating protrusions 130 formed on an interior rim 132 of the cover 104. When the cover 104 is positioned over the opening of the receptacle 102, the protrusions 130 on the interior rim 132 of the cover preferably slidably engage with the notch so as to lock the cover in place. It will be appreciated that other locking mechanisms known in the art can also be used to lock the cover in place.

Figure 2:
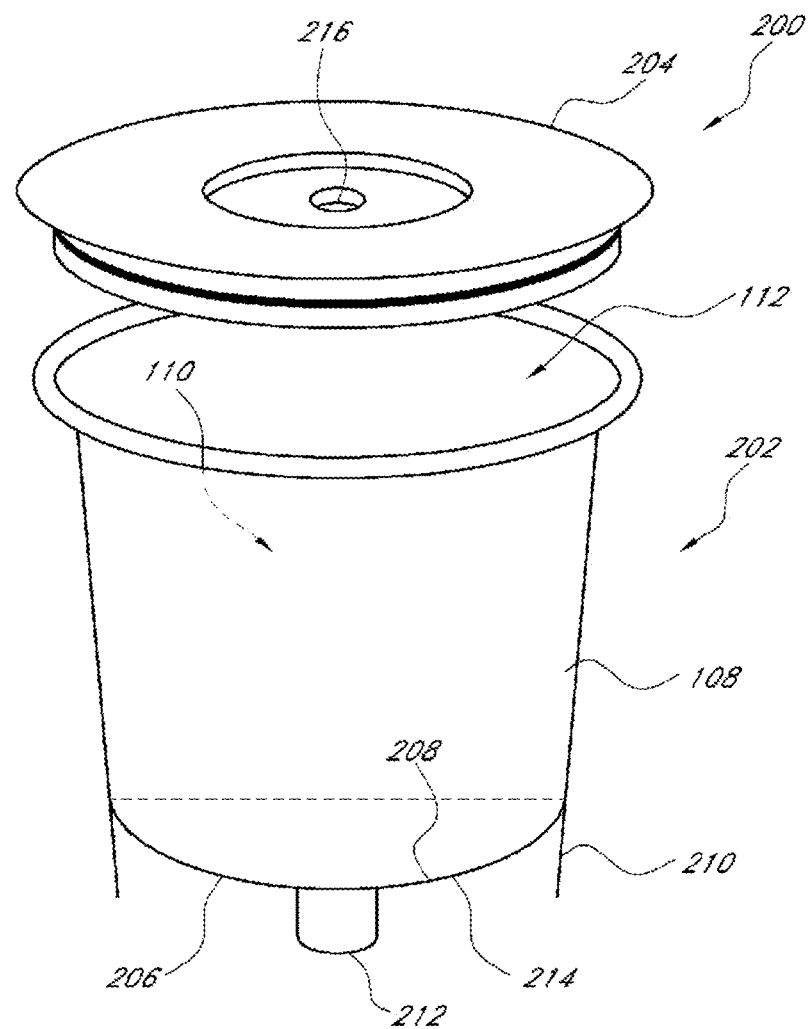
FIG. 2 is a schematic illustration of an exemplary embodiment of a pod adaptor assembly according to the invention.

FIG. 2 illustrates a pod adaptor assembly 200 of another embodiment of the present invention. The pod adaptor assembly 200 generally includes a cup-shaped receptacle 202 adapted to receive a pod and a cover 204 adapted to sealingly engage with the receptacle 202. The receptacle 202 has a base 206 having a downwardly sloping interior surface 208 supported by a plurality of legs 210. A passageway 212 extends downwardly from the exterior surface 214 of the base. The passageway 212 is adapted to guide and allow the needle from the brewer to extend upward without hitting against the receptacle or piercing the pod inside the receptacle. The passageway 212 also permits outflow of the brewed beverage from the receptacle. In one embodiment, the passageway 212 has a diameter of about 5 mm and a length of about 1 mm to 20 mm. The location of the passageway 212 relative to the base 206 is preferably selected to correspond to the location of the upward-moving needle in the brewer. In one embodiment, the passageway 212 is offset by about 1-5 mm from the center of the base. As also shown in FIG. 2, the cover 204 of the assembly 200 has an opening 216 formed therethrough, which is adapted to allow insertion of a liquid inlet probe from the brewer.

Figure 3A:
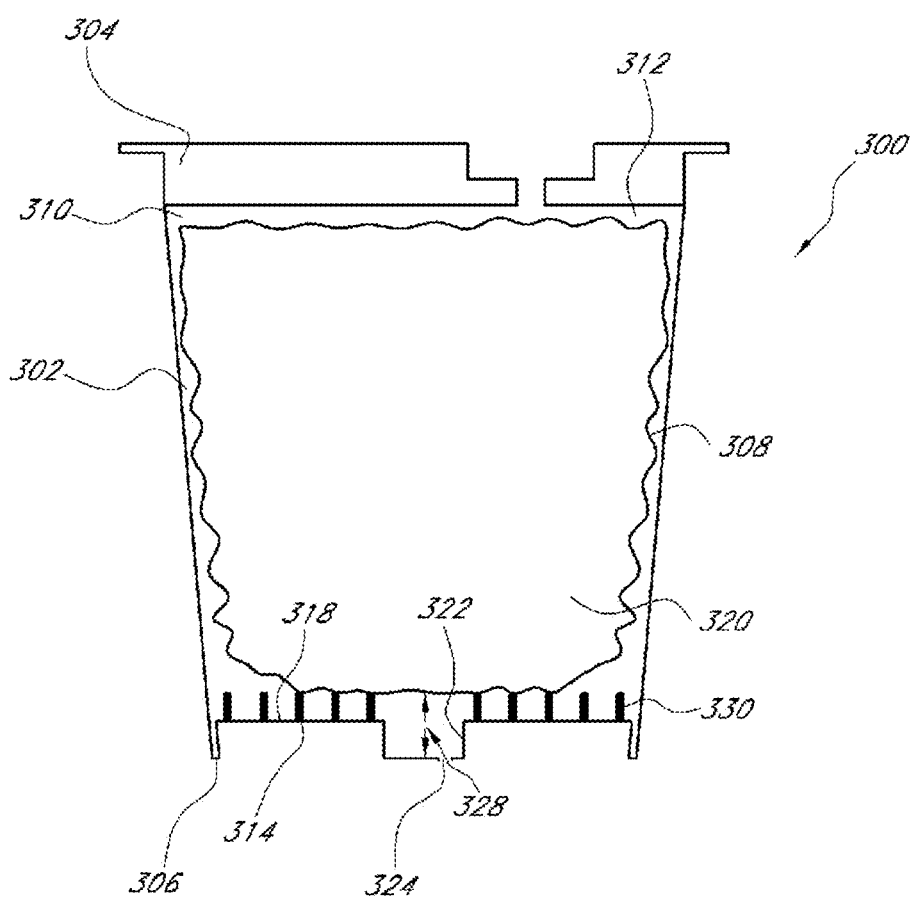
FIG. 3A is a schematic illustration of an exemplary embodiment of a pod adaptor assembly according to the invention.

FIG. 3A is a schematic illustration of a pod adaptor assembly 300 of another embodiment of the present invention. The pod adaptor assembly 300 generally includes a receptacle 302 and a cover 304 adapted to sealingly engage with the receptacle 302. The receptacle 302 has a substantially circular base 306 and sidewalls 308 extending upward from the base 306 defining a housing 310 having an upper opening 312. The base 306 has an annular raised portion 314 extending upward from a lower surface 316 of the base and an opening 324 formed in a portion of the base 322 that is not raised. The raised portion 314 provides a raised support surface 318 for a pod 320 so that the pod 320 does not contact and possibly block the opening 324 for brewed coffee to flow through. Preferably, the lower surface of the pod 320 is also elevated from the opening 324 by a distance 328 that is calculated to accommodate the upward extension of the puncture needle in the brewer during operation. In one embodiment, the distance 328 is between about 5 to 20 mm. In certain embodiments, a plurality of spaced-apart protrusions 330 are formed on the raised support surface 318, the protrusions 330 providing upward support for the pod 320. The gaps between the protrusions facilitate flow of brewed beverage from the pod toward the opening 324.

Figure 3B:
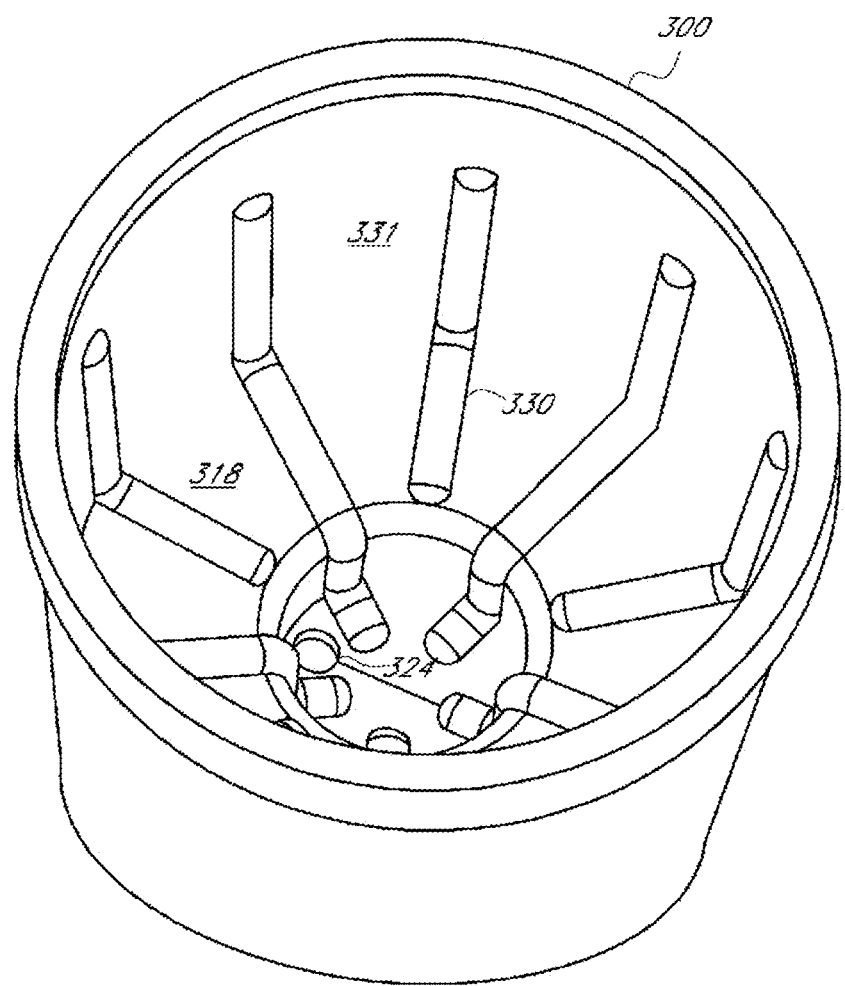
FIG. 3B is a schematic illustration of an exemplary embodiment of a receptacle of the pod adaptor assembly of FIG. 3A.

FIG. 3B illustrates radially-extending protrusions 330 of one implementation for the receptacle 300 of FIG. 3A. As shown in FIG. 3B, the protrusions 330 comprise a plurality of spaced-apart ribs disposed on an interior side wall 331 and both the raised and non-raised interior surface portions 318. As also shown in FIG. 3B, the opening 324 is located at an offset from the center of the base of the receptacle. The location is selected to correspond to the location of the puncture needle when the assembly is placed in the brewing chamber of the brewer.

Figure 4:
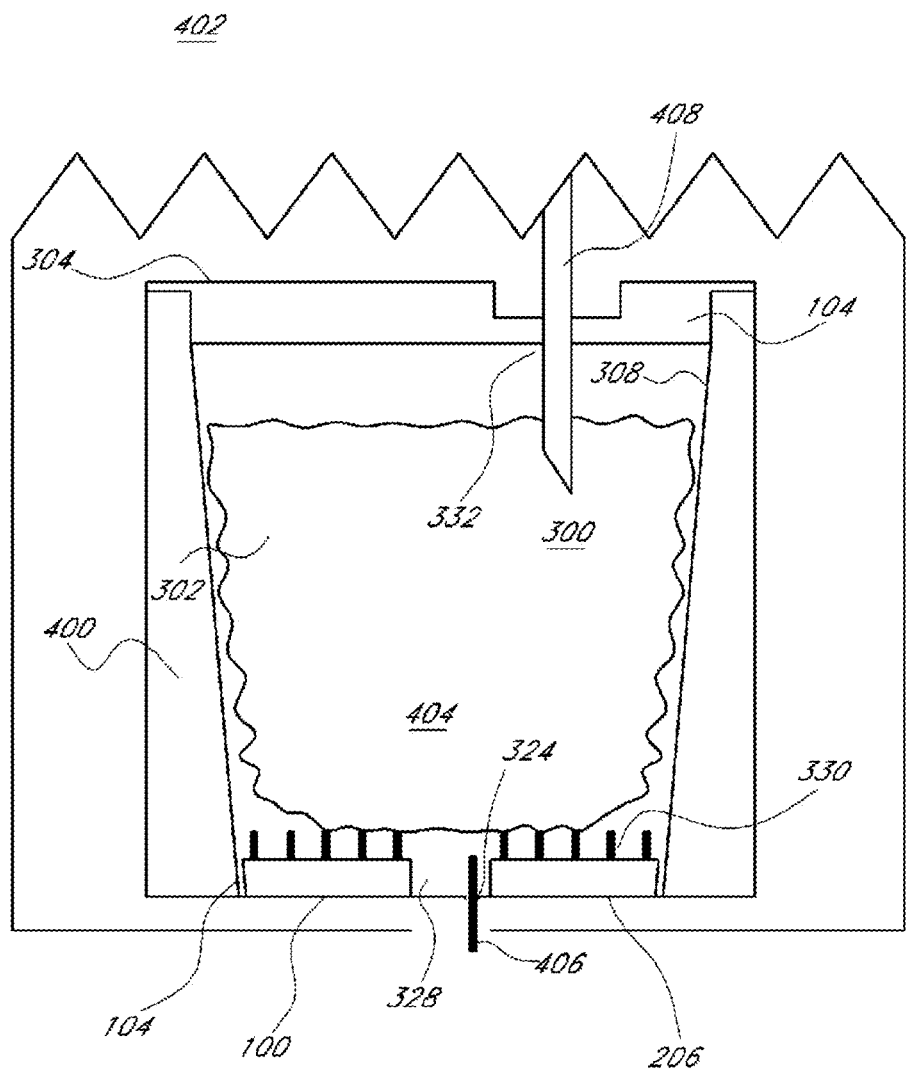
FIG. 4 is a schematic illustration of the pod adaptor assembly of FIG. 3 used in combination with a single-serving beverage brewer having upper and lower puncturing devices.

FIG. 4 is a schematic illustration of the pod adaptor assembly of FIG. 3A used in conjunction with a single-serving beverage brewer in brewing a beverage pod. As shown in FIG. 4, the pod adaptor assembly 300 is placed in a brewing chamber 400 of a single-serving brewer 402 known in the art and configured for brewing cup-shaped filter cartridges. In one embodiment, the single-serving brewer 402 is sold under the brand Keurig. As also shown in FIG. 4, a beverage pod 404, preferably containing ground coffee, is positioned inside the receptacle 302 of the assembly 100. The pod 402 preferably fits snugly inside the receptacle 302 and rests against the protrusion 330. In operation, a lower puncture needle 406 of the brewer extends upward through the passageway 116 of the receptacle 102. As described above, the lower puncture needle 406 is designed to extend upward and puncture the bottom of a cup-shaped cartridge that is normally inside the brewing chamber. To adapt the brewer 402 for use in brewing beverage pods that do not need to be punctured, the opening 324 in the base of the receptacle allows the puncture needle 406 to extend into the receptacle and the distance 328 between the opening 324 and the pod 404 is dimensioned such that the puncture needle 406 does not contact and pierce the pod 404. The distance advantageously provides an offset that accommodates the upward movement of lower puncture needle 406 without piercing the pod or damaging the needle. As also shown in FIG. 4, a liquid inlet probe 408 is extended downwardly through an opening 332 formed in the cover 304 of the assembly 300. In some embodiments, the pod 404 is positioned such that the liquid inlet probe 408 punctures the pod 404. In other embodiments, the pod 404 is positioned such that the liquid inlet probe 408 does not puncture the pod.

Figure 5:
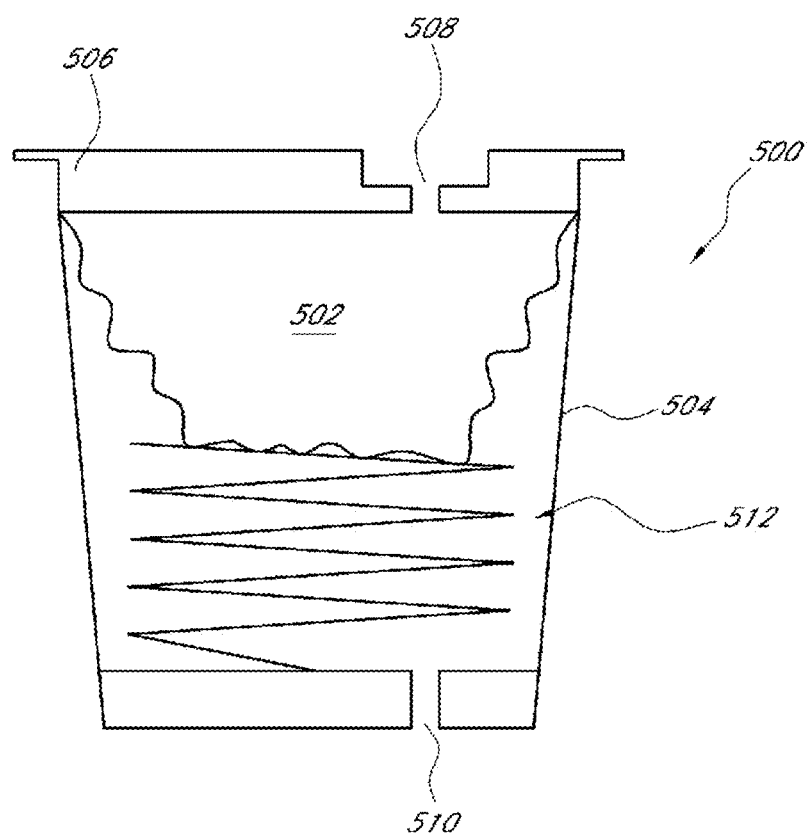
FIG. 5 is a schematic illustration of an exemplary embodiment of a pod adaptor assembly according to the invention.

FIG. 5 is a schematic illustration of another embodiment of the pod adaptor assembly 500 of the present invention, showing a cross-section of the assembly when used with a beverage pod 502. The pod adaptor assembly 500 includes a receptacle 504 and a cover 506 adapted to sealingly engage with the receptacle 504. The assembly 500 further includes a biasing mechanism 512 adapted to elevate and press the pod 502 against the cover 506 when the cover is sealingly engaged with the receptacle 504. In one implementation, the pressure applied against the pod advantageously compacts the ground coffee in the pod which has a similar effect as tamping the coffee. In certain embodiments, the assembly has an inlet 508 for introducing pressurized hot water into the receptacle and an outlet 510 for allowing outflow of brewed beverage. In one implementation as shown in FIG. 5, the inlet 508 is an opening formed in the cover 506 that is also adapted to receive a liquid inlet probe, which is part of a single-serving beverage brewers designed for cup-shaped cartridges. Also in the implementation shown in FIG. 5, the outlet 510 includes an opening formed in the base of the receptacle to allow for outflow of brewed beverage from the receptacle as well as unobstructed upward extension of a puncture needle that is part of certain single-serving beverage brewers designed for cup-shaped cartridges. By pressing the pod up against the cover, the pod is also pressed up against the inlet 508 through which hot water flows into the chamber. This advantageously "traps" the hot water in the pod for a longer period of time and produces a stronger and more consistent brewed beverage. In addition to being an adaptor assembly for cup-shaped brewers, the receptacle having a biasing device as shown in FIG. 5 can also serve as a brewing chamber for pod brewers.

In one embodiment, the biasing mechanism 512 is a spring positioned inside the receptacle and extending upward from the base. The flexibility of the spring is advantageous because it provides an adjustable support surface that can accommodate and apply pressure against pods of a variety of different sizes. In cases of thicker or larger pods, the spring can be simply compressed more to accommodate the pods. The spring can push the pods of different thicknesses and sizes up against the hot water being introduced into the receptacle. It will also be appreciated that a variety of different biasing mechanisms can also be used to press the pod against the inlet hot water. For example, the biasing mechanism can be a spring attached to the interior of the cover. As described above, pushing the pod against the hot water inlet compacts the ground coffee and also causes much less water to escape from the pod during the brewing process. As a result, a much stronger and consistent cup of coffee is produced.

Figure 6:
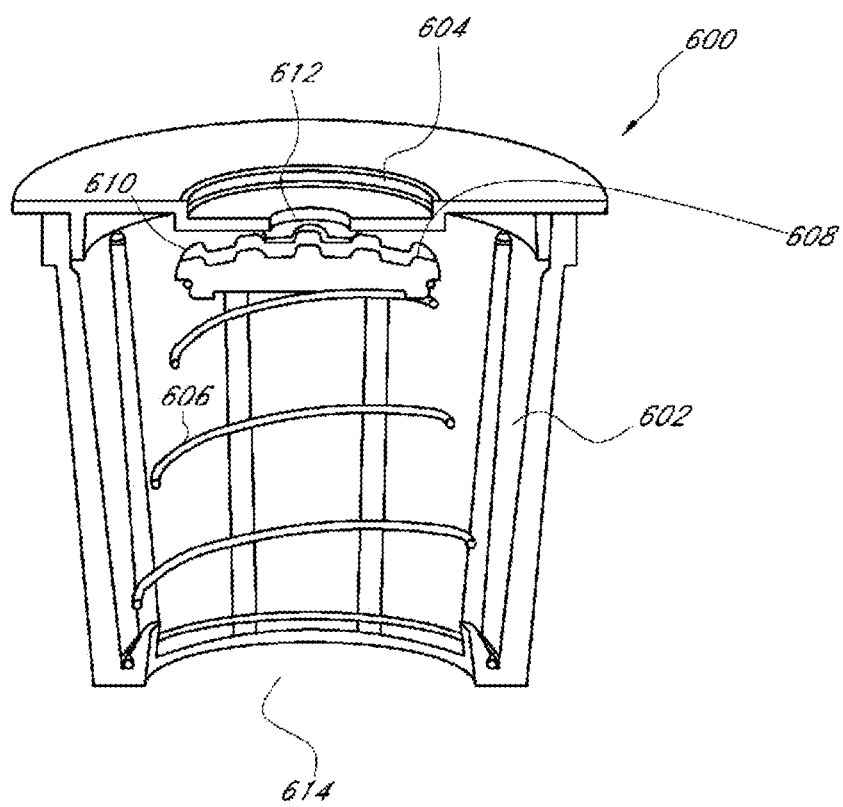
FIG. 6 is a cross-sectional view of an exemplary embodiment of a pod brewing chamber according to the invention.

FIG. 6 is a cross-sectional view of a pod brewing chamber 600 of an embodiment of the present invention incorporating the novel biasing mechanism. The pod brewing chamber 600 can be used in conjunction with a variety of different conventional pod brewers, such as those described in U.S. Pat. Nos. 6,904,840, 7,047,870 and 7,131,369, the disclosures of which are incorporated herein. The pod brewing chamber 600 includes a cup-shaped housing 602 and a cover 604. Preferably, the housing 602 is sized to receive a circular beverage pod. In a particular exemplary embodiment, the housing 602 has a height of about 44.5 mm, a lower diameter of about 35 mm and an upper diameter of about 45.5 mm. As also shown in FIG. 6, the brewing chamber 600 further includes a spring 606 extending upward from the bottom of the housing and a platform 608 attached to the upper end of the spring 606. In one implementation, the platform 608 includes a circular support having ribs arranged in a spaced-apart configuration across the upper surface of the platform 608. In operation, a coffee pod is inserted into the housing by being placed on the platform 608 and pressed downwardly until the pod is inside the housing and the cover 604 can be placed over the opening of the housing. As also shown in FIG. 6, the cover 604 has an opening 612 through which hot water can be injected into the housing. The brewing chamber further includes a lower opening 614 for brewed coffee to flow out of the chamber.

The unique concept of providing a biasing mechanism to press a coffee pod against the hot water inlet in a pod brewer can be applied to a variety of different coffee brewing systems. Preferably, when the spring is fully compressed, the force applied to a pod is preferably about 1.5 lb. The pressure range exerted against the pod can preferably range between 0 and 1.5 lbs. Thus, for example, a large pod will have more pressure exerted on it than a smaller pod, because the spring is compressed more. Moreover, the cross-section of the platform is preferably smaller than the diameter of the bottom so it can travel up and down the cup-shaped housing. In certain embodiments, the platform serves two functions by preventing the needle in certain single beverage brewers from perforating the pod from the bottom and also by pushing the pod evenly against the hot water inlet so when brewing the coffee produced is consistent.

As described above, the pressure applied against the pod by the biasing mechanism compacts the coffee and serves the function of tamping the coffee. Thus, less ground coffee is required to be packaged in a pod to brew a cup of coffee using the pod adapter of the invention. It will be appreciated that the biasing mechanism can also be incorporated in any of the pod adaptor assemblies described herein. The pod adaptor assembly of the invention can be made of a variety of different materials, including metal and plastics.

It should be apparent to those of skill in the art that the various embodiments of the invention as described herein can be used with loose grounds held by an open pouch made of water-permeable material. Such a pouch can be filled with coffee grounds of the user's choice and inserted into the pod adapter in place of a pod as described above. The water-permeable pouch can include a lid made of like material, either provided separately or hingedly attached to the pouch. Alternatively, the pod adapter can include a screen over the lower opening, or on the sidewall, so that loose grounds can be placed directly into the pod adapter for brewing, without the need for a pod or water-permeable pouch.

In summary, a beverage brewing container according to the invention is configured to replace a brewing cartridge in a brewing chamber of a beverage brewer, and preferably is made of material that allows it to be reusable. The container is positionable within the brewing chamber and is configured to hold brewing material while brewed by the beverage brewer. Depending on the particular embodiment or the needs of the user, the brewing material can be sealed in a pod, can be loosely placed in a pouch made of water-permeable material, or can be placed directly into the beverage brewing container. The brewing material can be ground coffee, or any other material, ground or otherwise, that can be used to produce a beverage by flowing a liquid through it.

The beverage brewing container includes a receptacle configured to receive and support the brewing material, and a cover. The receptacle includes a passageway, a base, and at least one sidewall. The passageway, for example, can be arranged in the base of the receptacle, but can be arranged in the sidewall instead, or in addition if more than one passageway is advantageous. The passageway provides fluid communication between an interior of the receptacle and the brewing chamber, that is, allows the brewed beverage to flow from the container into the brewing chamber of the beverage brewer. The passageway can have a serpentine arrangement, or can be wholly unobstructed, to provide direct flow.

The base of the receptacle has an interior surface and an exterior surface and is configured to avoid contact with the needle of the beverage brewer. The at least one sidewall extends upward from the interior surface of the base and is also configured to avoid contact with the needle. The cover is adapted to sealingly engage with a top edge of the at least one sidewall and includes an opening. Thus, the container can accept input fluid through the opening in the cover to allow the beverage material to be brewed, and can provide the corresponding outflow of fluid through the passageway. Because contact with the needle of the beverage brewer is avoided, the outflow substantially avoids the needle, which would normally accept the outflow. By avoiding the needle, the outflow can proceed elsewhere into the brewing chamber or directly into a mug or other vessel used to serve the beverage.

Figure 7:
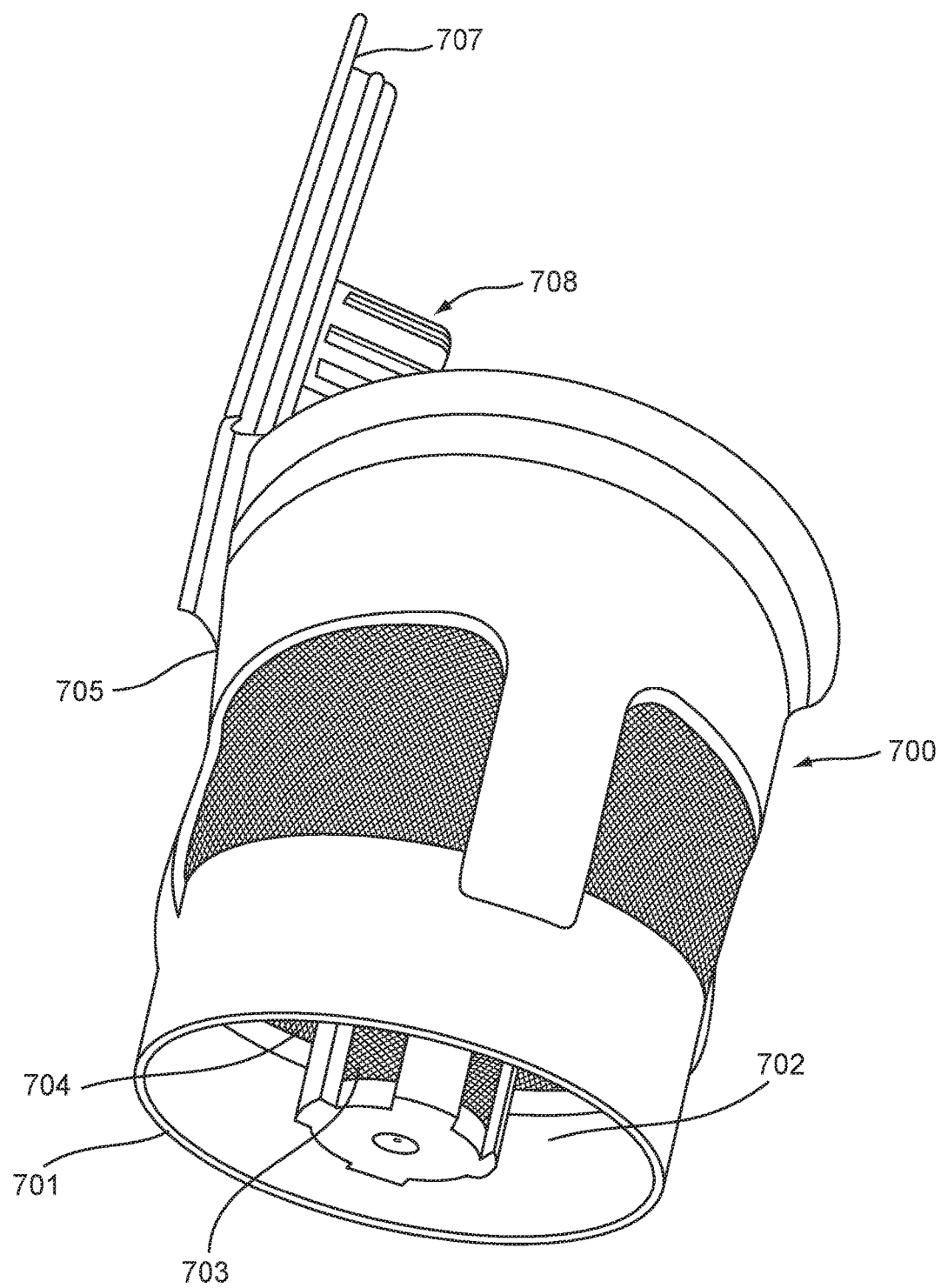
FIG. 7 is an illustration of another embodiment of the invention.

As shown in FIG. 7, the receptacle 700 can also include an extension 701 extending from the exterior surface of the base such that at least a portion of the base is raised a predetermined distance above the brewing chamber when the lower end of the extension 701 is in contact with the brewing chamber. As shown, the extension 701 can extend from a periphery of the base. Alternatively, or in addition, an extension 702 can extend from an interior portion of the base. In the latter case, the extension can include one or more apertures 703 at least partially covered by a screen material. This would allow loose grounds to be placed directly in the receptacle 700 for brewing, without the need for a pod or water-permeable pouch. The extension 702 can be included as the passageway described above, or can be included in addition to the passageway, to provide an additional avenue for beverage outflow. With or without the extension, the passageway likewise can include a screen 704, to allow for brewing of loose grounds.

In addition to or in place of the extension 702 and/or the passageway, at least one portion of the sidewall 705 can include an aperture 706 that is at least partially covered by a screen material. This would allow for outflow from the receptacle 700 for a beverage brewed from loose grounds.

The cover 707 can include a perforated bay 708 extending into the receptacle from the opening of the cover. The inflow fluid received through the bay 708 is dispersed onto the grounds in a manner that would depend in part on the character of the perforations in the bay 708. For example, the perforations shown in FIG. 7 are thin apertures arranged in a longitudinal direction with respect to the length of the bay 708. However, it is contemplated that circumferential apertures, round holes, or any other manner of perforation can be advantageously used.

The present invention has been described by way of example and in terms of preferred embodiments. However, it is to be understood that the present invention is not strictly limited to the particularly disclosed embodiments. To the contrary, various modifications, as well as similar arrangements, are included within the spirit and scope of the present invention. The scope of the appended claims, therefore, should be accorded the broadest possible interpretation so as to encompass all such modifications and similar arrangements.

What is claimed is:

1. A beverage brewing container, configured to be disposed within a brewing chamber of a beverage brewer and to hold brewing material while brewed by the beverage brewer, the container comprising:
   a receptacle configured to receive the brewing material; and
   a cover;
   wherein the receptacle includes a base, having an interior surface and a passageway in an interior area of the base, the passageway providing fluid communication from an interior of the receptacle to an exterior of the receptacle,
   a protrusion extending outward from a periphery of the passageway, wherein the protrusion includes at least one orifice covered by a screen material, and
   at least one sidewall extending upward from the interior surface of the base, wherein the cover is adapted to sealingly engage with a top edge of the at least one sidewall, the cover including an opening and a perforated bay extending from the opening, wherein the container is configured to accept input fluid through the opening and to provide a corresponding outflow of fluid through the passageway; and wherein the passageway allows the outflow fluid to flow from the container while accommodating a lower needle of the beverage brewer.

2. The container of claim 1, wherein the receptacle also includes at least one extension extending from an exterior surface of the base such that at least a portion of the base is raised a predetermined distance above a support surface when a distal end of the at least one extension is in contact with the support surface.

3. The container of claim 2, wherein the at least one extension extends from a periphery of the base.

4. The container of claim 1, wherein the container is reusable.

5. The container of claim 1, wherein the passageway has an unobstructed configuration.

6. The container of claim 1, wherein at least one portion of the at least one sidewall includes an aperture at least partially covered by a screen material.

7. A beverage brewing container configured to replace a brewing cartridge in a brewing chamber of a beverage brewer, wherein the container is positionable within the brewing chamber and configured to hold brewing material while brewed by the beverage brewer, the container including:
   a receptacle configured to receive and support the brewing material, and a cover; wherein the receptacle includes:
   a passageway providing fluid communication between an interior of the receptacle and the brewing chamber,
   a protrusion extending outward from a periphery of the passageway, wherein the protrusion includes at least one orifice covered by a screen material,
   a base, having an interior surface and an exterior surface and configured to avoid contact with a lower needle of the beverage brewer, and at least one sidewall extending upward from the interior surface of the base and configured to avoid contact with the lower needle;

wherein the cover is adapted to sealingly engage with a top edge of the at least one sidewall, the cover including an opening, and a perforated bay extending from the opening, and wherein the container is configured to accept input fluid through the opening and to provide a corresponding outflow of fluid through the passageway while the passageway accommodates the lower needle.

8. The container of claim 7, wherein the receptacle also includes at least one extension extending from an exterior surface of the base such that at least a portion of the base is raised a predetermined distance above a support surface when a distal end of the at least one extension is in contact with the support surface.

9. The container of claim 8, wherein the at least one extension extends from a periphery of the base.

10. The container of claim 7, wherein the container is reusable.

11. The container of claim 7, wherein the passageway has an unobstructed configuration.

12. The container of claim 7, wherein at least one portion of the at least one sidewall includes an aperture at least partially covered by a screen material.

* * * * *